(12) United States Patent
Lee et al.

(10) Patent No.: US 10,904,703 B2
(45) Date of Patent: Jan. 26, 2021

(54) METHOD AND APPARATUS FOR REPORTING GEOGRAPHIC INFORMATION OF IN-VEHICLE TERMINAL IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 16/099,560

(22) PCT Filed: May 15, 2017

(86) PCT No.: PCT/KR2017/004992
§ 371 (c)(1),
(2) Date: Nov. 7, 2018

(87) PCT Pub. No.: WO2017/196152
PCT Pub. Date: Nov. 16, 2017

(65) Prior Publication Data
US 2020/0260240 A1    Aug. 13, 2020

Related U.S. Application Data

(60) Provisional application No. 62/336,552, filed on May 13, 2016.

(51) Int. Cl.
*H04W 4/00* (2018.01)
*H04W 4/029* (2018.01)
(Continued)

(52) U.S. Cl.
CPC .......... *H04W 4/029* (2018.02); *H04W 4/027* (2013.01); *H04W 4/40* (2018.02); *H04W 4/44* (2018.02); *H04W 4/46* (2018.02); *H04W 4/48* (2018.02)

(58) Field of Classification Search
None
See application file for complete search history.

(56) References Cited

U.S. PATENT DOCUMENTS

2013/0258876 A1    10/2013  Damji et al.
2015/0085839 A1*   3/2015  Bergstrom ............ H04L 5/0078
                                                         370/336
(Continued)

FOREIGN PATENT DOCUMENTS

KR    1020140069750    6/2014
WO    2015147376       10/2015

OTHER PUBLICATIONS

Coolpad, "Discussion on UE location reporting for PC5-based V2V," R2-162353, 3GPP TSG RAN WG2 Meeting #93bis, Dubrovnik, Croatia, Apr. 1, 2016, see section 2.1, 2.2.

(Continued)

*Primary Examiner* — Elisabeth Benoit Magloire
(74) *Attorney, Agent, or Firm* — Dentons US LLP

(57) ABSTRACT

An in-vehicle terminal engaged in vehicle-to-everything (V2X) communication, especially vehicle-to-vehicle (V2V) communication, establishes a reporting cycle on the basis of the speed of the in-vehicle terminal, and transmits geographic information of the in-vehicle terminal to a network cyclically on the basis of the reporting cycle. That is, the reporting cycle may be shortened as the in-vehicle terminal speed increases, or may be lengthened as the in-vehicle terminal speed decreases.

5 Claims, 5 Drawing Sheets

(51) Int. Cl.
  *H04W 4/40* (2018.01)
  *H04W 4/02* (2018.01)
  *H04W 4/46* (2018.01)
  *H04W 4/48* (2018.01)
  *H04W 4/44* (2018.01)

(56) References Cited

U.S. PATENT DOCUMENTS

| | | | | |
|---|---|---|---|---|
| 2015/0296334 A1* | 10/2015 | Smyrk | H04W 8/02 | 455/456.3 |
| 2016/0040992 A1* | 2/2016 | Palella | B60W 40/107 | 702/152 |
| 2016/0234645 A1* | 8/2016 | Belghoul | G01S 5/0027 | |
| 2016/0295624 A1* | 10/2016 | Novlan | H04W 72/04 | |
| 2017/0309171 A1* | 10/2017 | Zhao | G08G 1/0112 | |

OTHER PUBLICATIONS

Qualcomm Incorporated, "RAN2 Aspects of V2V," R2-162731, 3GPP TSG RAN WG2 Meeting #93bis, Dubrovnik, Croatia, Apr. 1, 2016, see sections 2, 3.

* cited by examiner

METHOD AND APPARATUS FOR REPORTING GEOGRAPHIC INFORMATION OF IN-VEHICLE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2017/004992, filed on May 15, 2017, which claims the benefit of U.S. Provisional Application No. 62/336,552 filed on May 13, 2016, the contents of which are all hereby incorporated by reference herein in their entirety.

BACKGROUND OF THE INVENTION

Field of the Invention

The present invention relates wireless communication and, more particularly, to a method and an apparatus for reporting geographic information on an in-vehicle terminal in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

For efficient. V2X communication, it is being discussed that a user equipment transmits various types of information to a network. Among the various types of information, geographic information on the terminal is considered as essential information for the network to allocate a resource for V2X communication.

SUMMARY OF THE INVENTION

The present invention provides a method and an apparatus for reporting geographic information on a vehicle user equipment in a wireless communication system. The present invention provides a method and an apparatus for allocating a resource based on geographic information on the vehicle user equipment in a wireless communication system.

In an aspect, a method for reporting geographical information by a vehicle user equipment (UE) in a wireless communication system is provided. The method includes configuring a reporting interval based on a speed of the vehicle UE, and transmitting the geographic information of the vehicle UE to a network periodically based on the reporting interval.

In another aspect, a vehicle user equipment (UE) in a wireless communication system is provided. The vehicle UE includes a memory, a transceiver, and a processor, operably coupled to the memory and the transceiver, that configures a reporting interval based on a speed of the vehicle UE, and controls the transceiver to transmit the geographic information of the vehicle UE to a network periodically based on the reporting interval.

Geographic information on a vehicle UE can be adaptively transmitted to a network.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
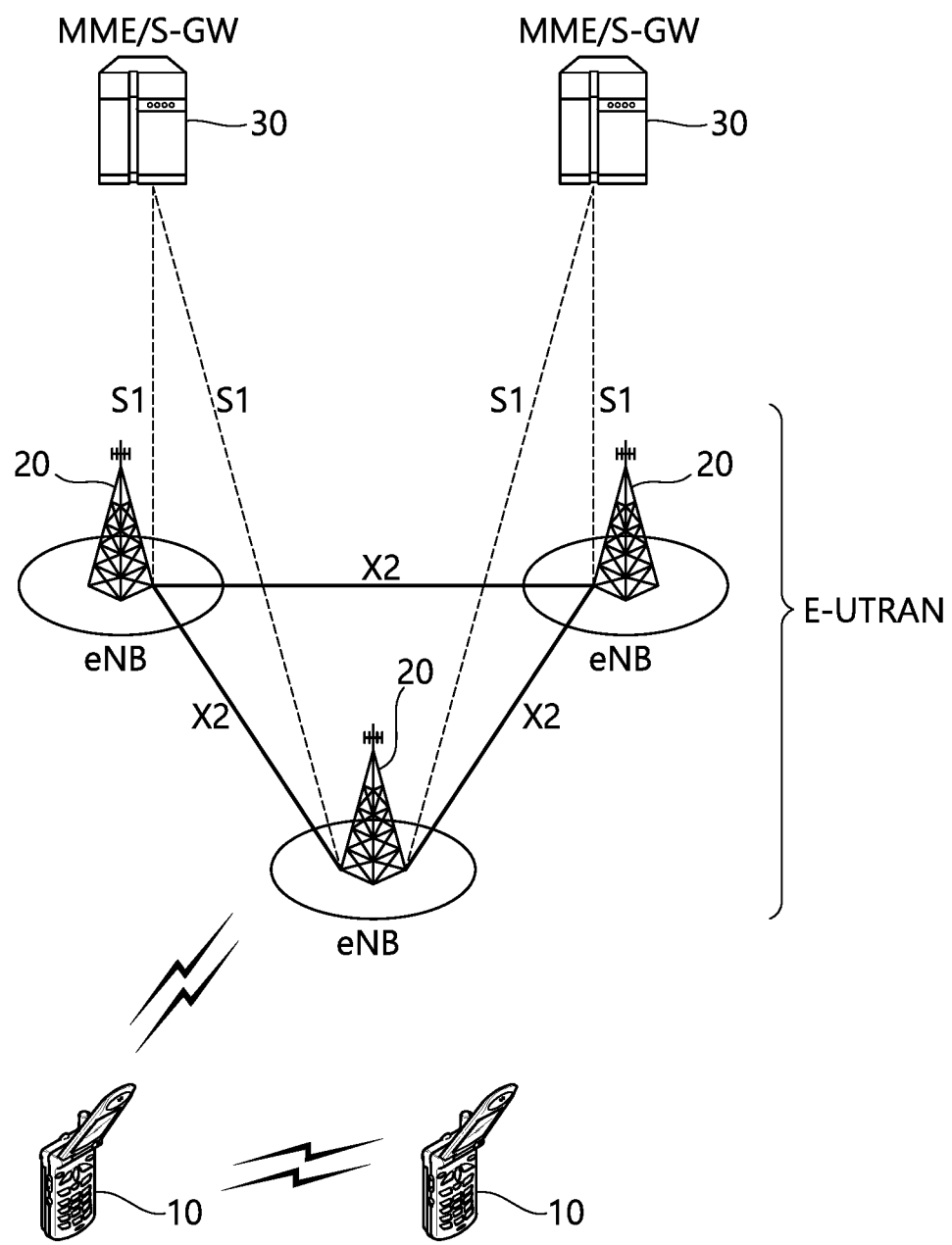
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an Si interface.

Figure 2:
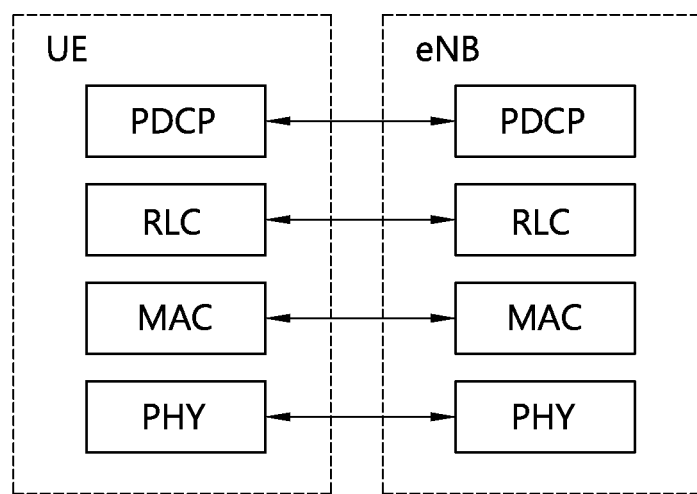
FIG. 2 shows a block diagram of a user plane protocol stack of an LTE system.
Figure 3:
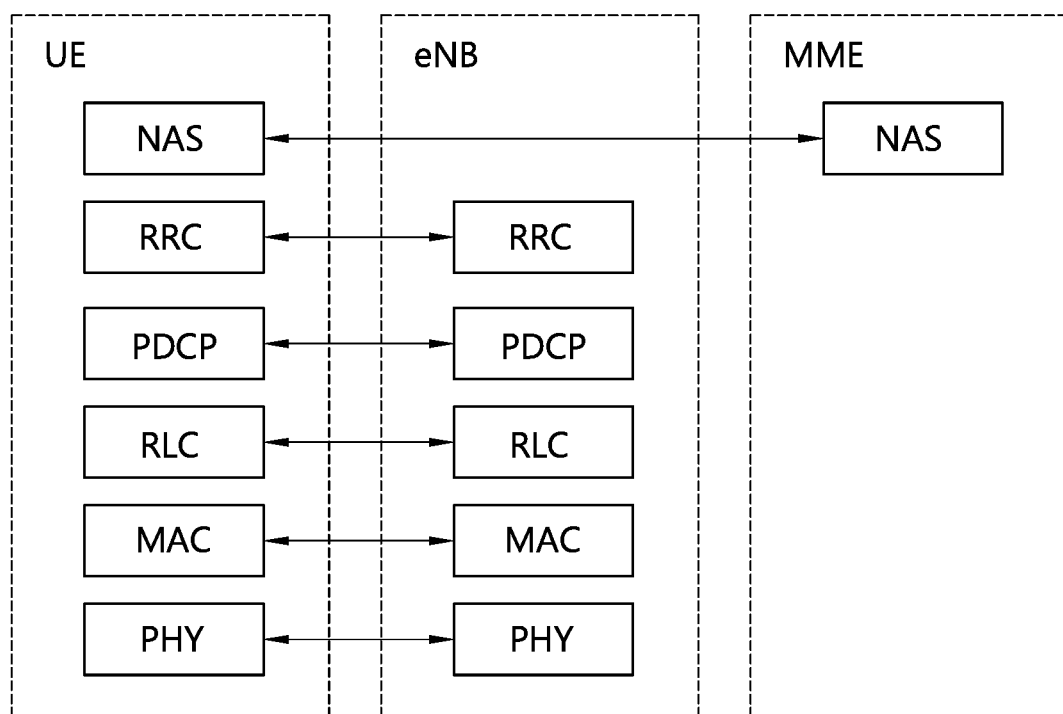
FIG. 3 shows a block diagram of a control plane protocol stack of an LTE system. A

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is a UE to UE interface for sidelink communication and sidelink discovery. The Sidelink corresponds to the PC5 interface. Sidelink communication is AS functionality enabling ProSe direct communication, between two or more nearby UEs, using E-UTRA technology but not traversing any network node. Sidelink discovery is AS functionality enabling ProSe direct discovery, using E-UTRA technology but not traversing any network node. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
Uu transmission/reception (highest priority);
PC5 sidelink communication transmission/reception;
PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

In V2X communication, messages such as common awareness messages (CAM), decentralized environmental notification messages (DENM), or basic safety messages (BSM) may be transmitted. The CAM includes information on a vehicle's type, a location, speed, a direction, etc., and may be periodically broadcasted by any vehicle. The DENM includes information on a type of a particular event and an area where the particular event has occurred, and may be broadcasted by an RSU or a vehicle. The BSM is included in the U.S. J2735 basic safety message, and have similar characteristics to those of the CAM. Through the BSM, an emergency brake warning, a front collision warning, an intersection safety support, a blind spot and line departure warning, a overtake warning, an out-of-control warning service may be provided.

For efficient V2X communication, it is being discussed that a UE transmits various types of information to a network. Particularly, for V2V communication, it is also discussed to transmit geographic information on a vehicle UE to the network, and the following agreements are made.

A geographic location report in an AS layer is introduced. A L1 report mechanism is not required. RRC signaling and/or an MAC control element (CE) may be used. Various types of information may be included in the geographic location report.

When and how to use geographic information depends on implementation by an eNB. The eNB may configure a UE to report geographic information.

A Mode 2 operation needs to be designed to operate without the need for UE-dedicated reporting.

The eNB provides a configuration for reporting geographic information. Here, periodic reporting, event-triggered reporting, or one-shot reporting may be considered.

Mapping of a geographic location and a resource may be performed on the concept of a zone. A zone may be defined in various ways. If necessary, mapping of a geographic location and a resource may be used for UL geographic reporting in order to optimize signaling.

The same mechanism may be adopted for out-of-coverage (OOC), and such optimization may not be applied to OOC.

Based on the above agreements, the present invention describes various aspects of geographic information reporting of a UE.

1. Definition of Zone

To cover various types of roads and to meet different tastes of operators in designing a zone in designing zones, a zone may include a list of reference locations. A reference location may be represented by a global navigation satellite system (GNSS) location. The shape of a zone may vary depending on reference locations and the number of reference locations. To identify a zone (for reporting to be described below), a zone ID may be explicitly signaled. However, to reduce the size of system information, a zone ID may be implicitly derived from the order of reference locations in a list. Thus, an eNB may broadcast each list of reference locations and a transmission resource pool associated with each reference location. That is, zone information may include a list of reference GNSS locations and a related zone ID, and the zone IDs may be indicated using the order of the reference GNSS locations in the list. Each reference location may be associated with a transmission resource pool.

2. Mode 2 Operation in Zone

As mapping of a geographic location and resource may be performed on the concept of a zone, a UE in mode 2, that is, in a UE autonomous resource selection mode, may select a transmission resource pool based on the location thereof. To this end, the eNB may broadcast zone information associated with a resource pool for the UE autonomous resource selection of at least a UE in RRC_IDLE. Considering that not only the associated zone information but also resource pool information may be different from those in Rel-12/13 sidelink communication and the purpose of V2X communication is dedicated to an intelligent transport system (ITS) service, the resource pool information and the associated information may be broadcast through a new system information block (SIB) for V2V use.

When zone information is provided, the UE may use the broadcast zone information for UE autonomous resource selection. To this end, the UE first periodically identifies the location thereof and determines a zone to which the UE belongs. A period for identifying the location of the UE depends on implementation by the UE. Determining a zone may mean that the UE determines which reference location is closest to the location of the UP. After determining the closest reference location (i.e. zone), the UP may select a transmission resource associated with the obtained zone.

In summary, the eNB may broadcast a sidelink transmission resource pool associated with a zone via a new SIB. The UE may select a reference location that is closest to the location of the UE, thereby periodically determining a zone in which the UP belongs. The UE in the UE autonomous resource selection mode may select a sidelink transmission resource pool mapped to the determined zone.

In addition to the UE in RRC_IDLE, a UE in RRC_CONNECTED may also operate in the UP autonomous resource selection mode. In order to support a UP autonomous resource selection operation without UE-dedicated reporting, it is necessary to provide a plurality of transmission resource pools mapped to a plurality of zones via dedicated signaling.

3. Report of Geographic Information

The UE may report geographic information on the UE to a network so that the network can efficiently allocate a sidelink transmission resource pool.

(1) Content of Geographic Information Report

Basically, the ID of a selected zone (i.e. the ID of a selected reference location) alone may be sufficient to help the network determine a sidelink resource. That is, the UE may report only the ID of the selected zone (i.e. the M of the selected reference location) to the network, and the network may allocate a sidelink transmission resource pool based on the received ID of the selected zone (or the ID of the selected reference location). This is based on the assumption that the foregoing location-based resource pool separation method does not require location accuracy in several meters but requires location information in dozens or hundreds of meters, which may be advantageous in terms of signaling resources. However, in some cases where the network wants full location information on the UE, the UP may report full location information. To this end, the network may configure whether the UP reports a zone ID or reports the location of the UP represented by the delta (i.e. the difference in location) between full location information and a selected reference GNSS location. Depending on the configuration by the network, the UE may report to the network a zone ID or the location of the UP represented by the delta between full location information and a selected reference GNSS location. The full location information may indicate the location of the UE indicated by the longitude, latitude, and/or altitude.

(2) Periodic Reporting

The geographic information on the UE may be periodically reported to the network. Basically, a period for reporting the geographic information may be configured by the network through RRC. In addition, the period for reporting the geographic information may be determined based on the speed of the UE and/or the effective range of an allocated resource. For example, when the effective range of the allocated resource is hundreds of meters and the UP moves at a speed of about 100 km/h, the UE may need to report the geographic information thereof about every 10 seconds. However, as the UE speeds up, a PC5-V2V resource also needs to be adapted accordingly. To this end, the period for the UE to report the geographic information may also be adapted to the speed of the UE. A scaling parameters needed to adjust the period for reporting the geographic information according to the speed of the UP may be configured by the network.

There is a parameter 'reportAmount' that defines the number of times the current measurement is reported. Likewise, a similar parameter may be needed to define how long the UE needs to report the geographic information. That is, the number of tunes the UE reports the geographic information and/or a period for which the UE reports the geographic information may be configured by the network. A default value may be infinite since it is considered that the UE needs to report the geographic information as long as a sidelink resource operates based on the concept of a zone.

(3) Event-Triggered Reporting

Alternatively, the geographic information on the UE may be reported to the network when triggered by an event. The event may be defined based on speed, a distance change, or a heading change relative to a threshold value. However, defining such an event is not considered to be significantly advantageous for complexity and effort in supporting resource distribution. Therefore, the UE may merely report the geographic information to the network whenever a zone is changed. That is, in geographic information reporting triggered by an event, the event may be defined as a change in zone.

Whenever the primary cell (PCell) is changed, the UE may trigger reporting of location information and may report, to the network, the location of the UE represented by the delta between full location information and a selected reference GNSS location. In a handover (HO) preparation procedure, latest zone ID information on the UE may be reported from a serving cell to a target cell. An HO command may include information on a list of reference locations of the target cell. In addition, transmission/reception/synchronization information associated with each reference location may also be provided from the target cell to the source cell. When the UE does not obtain an SIB broadcasting zone information in the target cell, the UE may report the full location information to the network after a handover. During handover procedure, the UE may not report zone information even though the zone to which the UE belongs is changed. The UE may always report latest location information to the network. When the UE reports an update location request (ULR) along with the latest location information, the UE may discard all triggered ULRs.

(4) Reporting Layer

Another aspect of reporting the geographic information on the UE is which layer of the UE, that is, which among MAC and RRC layers, is used for reporting the geographic information on the UE. In enhanced device-to-device (eD2D), the selection of a transmission resource pool is performed in the MAC or RRC layer. Similarly, unless there is a significant advantage, the MAC or RRC layer may be used for a transmission resource pool for PC5-V2V. Also, considering that the geographic information on the UE is used for selecting a transmission resource pool, the MAC or RRC layer may be considered as an appropriate layer in reporting the geographic information on the UE.

However, RRC signaling may have signaling overheads as compared to MAC signaling. Further, an RRC message for a measurement report is generally retransmitted in an RLC layer when lost or and unacknowledged. However, it may be acceptable to unnecessarily report an outdated. UE location due to the loss of some of this type of message and an RLC acknowledged-mode (AM) operation. Considering these aspects, the MAC layer may be a more suitable layer for reporting the geographic information on the UE to the network. That is, the geographic information on the UE may be reported to the network via a new MAC CE. The MAC CE for reporting the geographic information on the UE has a higher priority than data but may have a lower priority than other MAC CEs in CCCH/DCCH and logical channel prioritization (LCP).

(5) Mobility

A cell may broadcast zone information for a zone covering a contiguous cell (i.e. a neighboring zone). A GNSS-synchronized UE may use a PC5 resource pool mapped to the neighboring zone until the UE obtains an SIB from the target cell.

(6) Selection of Zone Information-Based Temporary Mobile Group Identity (TMGI)

As described above, zone information may be broadcast via a new SIB or dedicated signaling. The zone information may include a list of reference GNSS locations and a related zone ID. The zone ID may be indicated using the order of the reference GNSSS locations in the list.

The zone information may be used to select a TMGI for MBMS. Specifically, the UE may periodically select a reference location closest to the location of the UE, thereby determining a zone where the UE is located. A TMGI may be mapped to one or more zones listed in the zone information. The UE may select a TMGI mapped to the determined zone. The UE may select and pay attention to the TMGI mapped to the determined zone.

Figure 4:
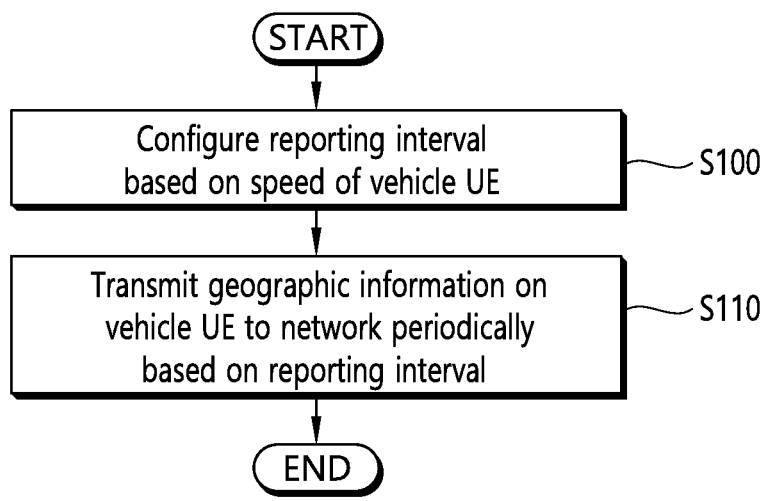
FIG. 4 shows a method in which a vehicle UE reports geographic information according to an embodiment of the present invention.

FIG. 4 shows a method in which a vehicle UE reports geographic information according to an embodiment of the present invention. The content of the present invention described above may be applied to the present embodiment.

In step S100, the vehicle UE configures a reporting interval based on the speed of the vehicle UE. That is, the reporting interval may become shorter as the speed of the vehicle UE increases. Further, the reporting interval may become longer as the speed of the vehicle UE decreases. A scaling parameter used to configure the reporting interval based on the speed of the vehicle UE may be configured by a network.

In step S110, the vehicle UE, periodically transmits geographic information on the vehicle UE to the network according to the reporting interval. The number of times the geographic information is reported or a period for which the geographic information is reported may be configured by the network.

The geographic information may include information on a zone to which the vehicle UE belongs. The information on the zone may include a list of reference GNSS locations and the ID of the zone. The ID of the zone may be indicated using the order of the reference GNSS locations in the list. The information on the zone may be broadcast from the network. Alternatively, the geographic information may include full location information on the vehicle UE. The full location information on the vehicle UE may be indicated using the longitude, latitude, and altitude of the vehicle UE. Alternatively, the geographic information may include a difference value between a reference GNSS location nearest to the location of the vehicle UE and the location of the vehicle UE.

The geographic information may be transmitted via an MAC CE. The geographic information may have a higher priority than data.

Figure 5:
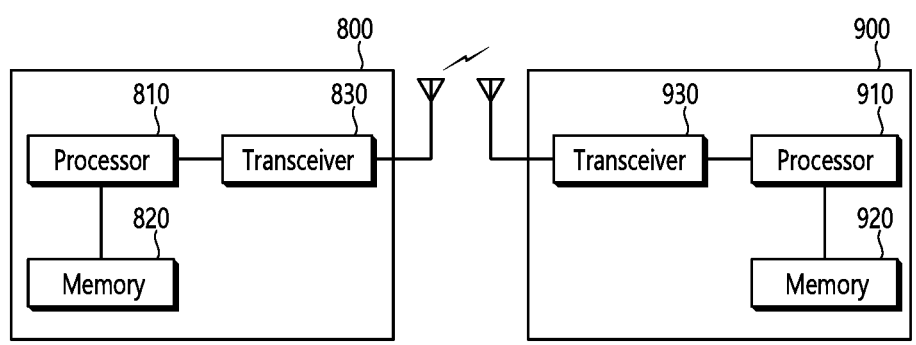
FIG. 5 shows a wireless communication system to implement an embodiment of the present invention.

FIG. 5 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for reporting geographical information by a vehicle user equipment (UE) in a wireless communication system, the method comprising:
    configuring a reporting interval based on a speed of the vehicle UE, wherein the reporting interval is shortened as the speed of the vehicle UE increases and lengthened as the speed of the vehicle UE decreases;
    receiving, from a network, a configuration for the content of the geographical information;
    determining that the content of the geographical information includes first type content, second type content, or third type content based on the configuration for the contents of the geographical information; and
    transmitting, via a media access control (MAC) control element (CE) to the network, the geographic information including the content based on the reporting interval,
    wherein the geographical information has a higher priority than data,
    wherein the first type content of the geographical information includes information on a zone in which the vehicle UE belongs, wherein the information on the zone consists of a list of reference global navigation satellite system (GNSS) positions and associated zone identity (ID), wherein the associated zone ID is represented as an order in the list of the reference GNSS positions,
    wherein the second type content of the geographical information includes location information of the vehicle UE represented by a longitude, a latitude, and an altitude of the vehicle UE, and
    wherein the third type content of the geographical information includes a difference between a location of the vehicle UE and a reference GNSS position closest to the location of the vehicle UE.

2. The method of claim 1, wherein a scaling parameter used for configuring the reporting interval based on a speed of the vehicle UE is configured by the network.

3. The method of claim 1, wherein a number of reporting or a duration of reporting is configured by the network.

4. The method of claim 1 further comprising:
    receiving, from the network, a list of zones; and
    determining the zone in which the vehicle UE belongs among the list of zones, wherein the list of the zones is broadcast by the network.

5. A vehicle user equipment (UE) in a wireless communication system, the vehicle UE comprising:
    a memory;
    a transceiver; and
    a processor, operably coupled to the memory and the transceiver, that:
    configures a reporting interval based on a speed of the vehicle UE, wherein the reporting interval is shortened as the speed of the vehicle UE increases and lengthened as the speed of the vehicle UE decreases,
    receive, from a network, a configuration for the content of the geographical information;
    determine that the content of the geographical information includes first type content, second type content, or third type content based on the configuration for the content of the geographical information; and
    controls the transceiver to transmit, via a media access control (MAC) control element (CE) to the network, the geographic information including the content based on the reporting interval,
    wherein the geographical information has a higher priority than data,
    wherein the first type content of the geographical information includes information on a zone in which the vehicle UE belongs, wherein the information on the zone consists of a list of reference global navigation satellite system (GNSS) positions and associated zone identity (ID), wherein the associated zone ID is represented as an order in the list of the reference GNSS positions,
    wherein the second type content of the geographical information includes location information of the vehicle UE represented by a longitude, a latitude, and an altitude of the vehicle UE, and
    wherein the third type content of the geographical information includes a difference between a location of the vehicle UE and a reference GNSS position closest to the location of the vehicle UE.

* * * * *